United States Patent
Roach

(10) Patent No.: US 7,130,901 B2
(45) Date of Patent: Oct. 31, 2006

(54) NETWORK SERVICE PROVIDER PLATFORM FOR SUPPORTING USAGE SENSITIVE BILLING AND OPERATION SERVICES

(75) Inventor: Tynan George Roach, Germantown, MD (US)

(73) Assignee: **ACE*COMM Corporation**, Gaithersburg, MD (US)

( * ) Notice: Subject to any disclaimer, the term of this patent is extended or adjusted under 35 U.S.C. 154(b) by 672 days.

(21) Appl. No.: 10/032,704

(22) Filed: Jan. 2, 2002

(65) Prior Publication Data

US 2002/0087682 A1  Jul. 4, 2002

Related U.S. Application Data

(60) Provisional application No. 60/258,883, filed on Jan. 2, 2001.

(51) Int. Cl.
*G06F 15/173* (2006.01)
*G06F 15/16* (2006.01)

(52) U.S. Cl. ..................... 709/224; 709/246

(58) Field of Classification Search .......... 709/223, 709/229, 224, 226, 246; 719/318; 705/7, 705/34, 52, 53; 707/10
See application file for complete search history.

(56) References Cited

U.S. PATENT DOCUMENTS

| | | | |
|---|---|---|---|
| 5,197,002 A * | 3/1993 | Spencer | 705/34 |
| 6,047,268 A | 4/2000 | Bartoli et al. | |
| 6,119,109 A | 9/2000 | Muratani et al. | |
| 6,418,467 B1 * | 7/2002 | Schweitzer et al. | 709/223 |
| 6,539,082 B1 * | 3/2003 | Lowe et al. | 379/114.28 |

OTHER PUBLICATIONS

International Search Report dated May 15, 2002.

* cited by examiner

*Primary Examiner*—William C. Vaughn, Jr.
*Assistant Examiner*—Yemane M. Gerezgiher
(74) *Attorney, Agent, or Firm*—Hogan & Hartson LLP

(57) ABSTRACT

The present invention provides a platform for supporting usage based and usage sensitive billing and operation services and systems for network service providers. The platform provides an environment that supports the collection of statistics and call records from various network (voice, data, etc.) elements, validation of the data, conversion of the data into a normalized format, and the configuration of a core provisioning process for rating the data and generating the appropriate billing charges.

23 Claims, 8 Drawing Sheets

NETWORK SERVICE PROVIDER PLATFORM FOR SUPPORTING USAGE SENSITIVE BILLING AND OPERATION SERVICES

CROSS REFERENCE TO RELATED APPLICATION

This application claims priority from U.S. Provisional Patent Application No. 60/258,883, filed Jan. 2, 2001, the disclosure of which is hereby incorporated by reference in its entirety.

FIELD OF THE INVENTION

The present invention relates to a platform for supporting usage based and usage sensitive billing to combine with the operation and business support systems of network service providers.

BACKGROUND OF THE INVENTION

Network service providers generally desire the increased flexibility provided by usage based billing options. Generally, the ability to determine how much and how often particular clients use a shared network system or even specific network elements allows network service providers to increase customer savings by, for example, charging reduced usage rates during "off-peak" usage periods. Such incentives for off-peak usage tend then to normalize traffic patterns across peak and off-peak periods and thus optimize resource allocation.

However, since any two given networks are rarely alike, the development of a platform for enabling usage sensitive billing must be able to integrate various network elements that operate according to a variety of different protocols and utilize different input and output data formats. Furthermore, usage based billing is further additionally complicated by the fact that many next generation network service provider elements and devices today employ event-oriented data reporting mechanisms. Specifically, calls, online sessions, and network traffic routed through various networking equipment elements are typically comprised, as far as the network elements are concerned, of multiple separate events with each event being performed by different equipment and each piece of equipment then generating different types of vital information.

For example, a basic voice call may be broken into three different sequential events, namely a call initiation/setup event, a call continuation event (or alternatively several call continuation events), and a call termination event. In such a case, it may be that information detailing the calling and called party are detailed only in a call initiation/setup event data record, a continuation event data record solely contains information detailing the number of bytes of information transferred over a given time interval (i.e., degree of usage), and a termination event data record solely contains a needed call completion code (such as a unique ID). Assuming parts of all three types of information are needed to properly allocate expenses in a particular usage based billing scheme, then combining this separate information into a single call record (or "usage record") would be necessary. As would be readily appreciated by one skilled in the art, combining information from data records for related events into a single call record is necessarily made more difficult when different network elements or systems (potentially operating according to different protocols and utilizing different data formats) are involved in the billable usage session. This problem, of course, becomes increasingly more predominant as the networks and usage based billing schemes become more complex.

Data network usage sessions also commonly are broken into multiple usage events similar in the manner as described with respect to voice networks above. Thus, a manner for combining event data records for the various usage events into a single usage detail record would be necessary for data network service providers as well.

Additionally, if the data in collected call or usage records must be combined with or in some way used in combination with one or more other collected call or usage records before a final detail record output suitable for use by an Operation Support System ("OSS") or Business Support System ("BSS") can be produced, then these data records must be aggregated. Contemporary platforms for enabling usage sensitive billing must take into account the fact that trends in next-generation networking equipment have moved the aggregation of such events into the responsibility of the OSS or BSS. However, OSS and BSS components, such as billing systems or decision support systems, are by their nature not readily adaptable to changes in the number and types of events that may comprise a single logical call or online session. As such, this approach has not produced robust yet flexible data collection platforms.

Therefore, a mediation solution is needed that provides a platform for easily collecting and aggregating processed information into a format acceptable for downstream applications and OSS/BSS components. This mediation solution must be able to collect relevant data from a wide variety of disparate networking equipment types, including Frame Relay, ATM, X.25, SIP and IP devices.

Thus, there remains a need in the art for improved systems and methods that can provide a flexible mediation solution for collecting and aggregating processed usage information and transforming that information into a format acceptable to for downstream applications such as a BSS or OSS.

SUMMARY OF THE INVENTION

In light of the drawbacks inherent in the prior art, it is an object of the present invention to provide a system and accompanying methods to provide a platform that collects usage data records and prepares the records for use by a downstream BSS/OSS.

Also, it is an object of the present invention to provide a usage based billing platform that validates, normalizes, aggregates and rates call or network traffic records, and then distributes data representative of such ratings to downstream applications.

Concurrently, it is an object of the present invention to provide such a system and method that operates across distributed computer networks whereby users can be located at various remote locations and the system can produce normalized usage detail records for use by an entire organization including downstream business support systems and operation support systems.

Similarly, it is an object of the present invention to provide a system and accompanying methods to support usage based billing schemes wherein the system of a network service provider may be made readily and easily adaptable to the introduction of new technologies and/or network elements into the system.

In response to the above-described and other needs and objects, systems of the present invention accomplish the above by employing a multi-tiered architecture including employing a front end sub-system, a core mediation sub-system, and a back end sub-system. The front end sub-system according to the present invention collects statistics and call event data from various elements, validates the collected data, and converts the data to a normalized format. After this normalization, the core mediation sub-system utilizes an aggregation engine to operate on this normalized data to associate and combine usage event data records into comprehensive usage detail records. Finally, the back end sub-system according to the present invention takes the aggregated normalized usage detail records and provides industry standard output formatted data (such as BAF, EMI or IPDR) through appropriate protocols to downstream OSS/BSS components.

The architecture of preferred embodiments of the present invention allows users to rapidly adapt currently implemented embodiments of the present invention to develop solutions for new next-generation networking equipment partners. The preferred architecture of the present invention employs a core set of administrative mediation functionality within the core mediation subsystem such that this functionality does not need to be updated as new protocols, systems, services or vendors are added to the network. The multi-tiered architecture of the present invention enables standardization and re-use of the core mediation sub-system due to the use of the normalized usage data format being used for representing service specific event data. Therefore, a data collection platform is provided that supports usage-sensitive billing suitable for network service providers who operate networks of various types, including X.25, frame relay ATM, and VoIP networks.

Other embodiments of the present invention pertain to related processes that allow a data collection platform to support usage sensitive billing suitable for use by network service providers that operate network of various types. The processes according to the present invention collect statistics and call/usage event records from various elements of a given network, validate the collected data, and convert the data to a normalized format. The process then aggregates the normalized data that it receives from the various sources into full, usage detail records. The processes according to the present invention then convert the aggregated data into various pre-defined data output formats as necessary and communicates the formatted aggregated usage detail records to network elements and downstream applications in necessary formats through necessary protocols.

According to one or more aspects, the data capturing collection platform systems and related methods according to the present invention can be adapted to utilize polling or spooling data collection modes, support multiple input and output protocols, operate in primary or secondary collection modes, and produce various proprietary and standardized records formats including Bellcore Automated Message Accounting format ("Bellcore AMA format" or "BAF"), exchange message interface ("EMI") format, and internet protocol detail record ("IPDR") format. Further, the present invention supports point-to-point and point-to-multi-point call record processing.

The present invention thereby provides a cost-effective way to integrate new network technologies into a hybrid environment that works with packet and IP-based network elements to produce usage records similar to traditional voice call records. In this manner, network service providers are able to integrate new technologies that support voice, IP, X.25, frame relay, ATM, radio, SIP and VoIP into their existing networks without changing downstream operations and business support systems by processing the data generated by the new network elements and creating a data stream in the format(s) understood by the existing OSS/BSS infrastructure.

Data collection platform systems according to preferred embodiments of the present invention operate in a networked environment and comprise network hardware components connected through high-speed communication links. The platform system includes a data collection front end component, a core mediation component having an engine for data processing and mediation, and a back end component. The front end supports both polling and spooling depending how data transmission is normally initiated for each network element component and captures event data, validates the data and converts it into a normalized format for transfer to the core engine. More than one front end component can be employed to collect data simultaneously from a variety of disparate sources.

The core processing engine aggregates the data, and optionally performs any user-defined functions (such as augmentation with external data, correlating, rating and reformatting) on the aggregated data. In preferred embodiments of the present invention, the aggregated data is stored in an in-memory database using hashing algorithms and memory management routines to provide fast execution times. So as to be readily interoperable with downstream elements and components, aggregated data is then converted into a user-defined output format using appropriate protocols by the back end component.

In more preferred embodiments, the present invention allows the data optionally to be rated according to billing rules as they are processed in the core processing engine component. In this manner, downstream rating functionality, typically provided by an individual downstream OSS/BSS rating and billing component, is not necessary.

In other preferred embodiments, a single continuous process is implemented to carry out collection, normalization, aggregation and the exchange of usage data. In this manner, writing information and data to files and databases is minimized and thus minimizes the number and frequency of input/output computing operations leading to increased computing performance.

In any one of the embodiments of the present invention a user interface permits a user to interact with one or more databases to define a plurality of configuration rules defining the type and format of call/usage event data generated and/or needed by each network element. Optionally, the user interface permits users to review and modify these configuration rules with a graphical user interface or web-based interface whenever new network elements, standards or usage based billing schemes are introduced.

Additional features and advantages of the invention are set forth in the description that follows, and in part are apparent from the description, or may be learned by practice of the invention. The objectives and other advantages of the invention are realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings with like reference numbers representing corresponding parts throughout.

DETAILED DESCRIPTION OF THE PREFERRED EMBODIMENTS

Reference is now made in detail to the preferred embodiment of the present invention, examples of which are illustrated in the accompanying drawings.

Figure 1:
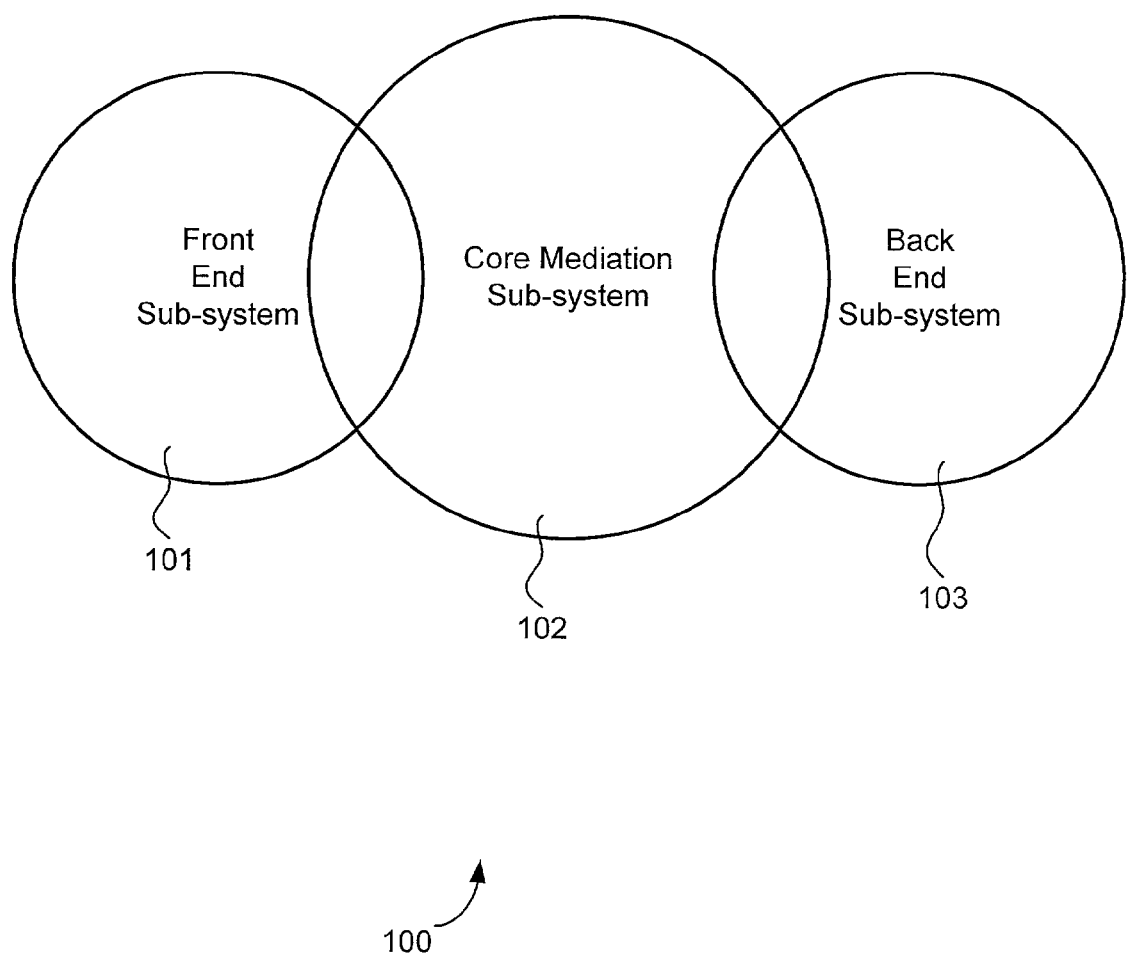
FIG. 1 is a schematic diagram depicting the three tier structure employed in embodiments of the present invention.

Referring first to FIG. 1, there is presented a schematic diagram that depicts the three tier structure 100 employed in embodiments of the present invention. The multi-tiered structure employs a front end subsystem 101, a core mediation sub-system 102, and a back end subsystem 103. The front end sub-system 101 of the present invention collects call or usage event data from various network sources and converts them into a predefined usage data format that normalizes device and service specific event data representations. The core mediation sub-system 103 employs a core set of mediation functionality that operates on the normalized data provided by the front end sub-system 101 and thereby associates and combines usage event data records into comprehensive usage detail records. Finally, the back end sub-system 103 according to the present invention converts the aggregated usage detail records into industry standard output formats (such as BAF, EMI or IPDR) and transmits these converted aggregated usage detail records through a variety of protocols to downstream OSS/BSS components. As will be readily appreciated by one skilled in the art, using a three tier structure 100 allows the core mediation sub-system to encompass only completely reusable operations such that it does not need to be updated as new protocols, systems, services or vendors are added to the network. The present invention thereby provides a data collection platform that is easily adaptable to support usage-sensitive billing for network service providers who operate networks of various different types.

Figure 2:
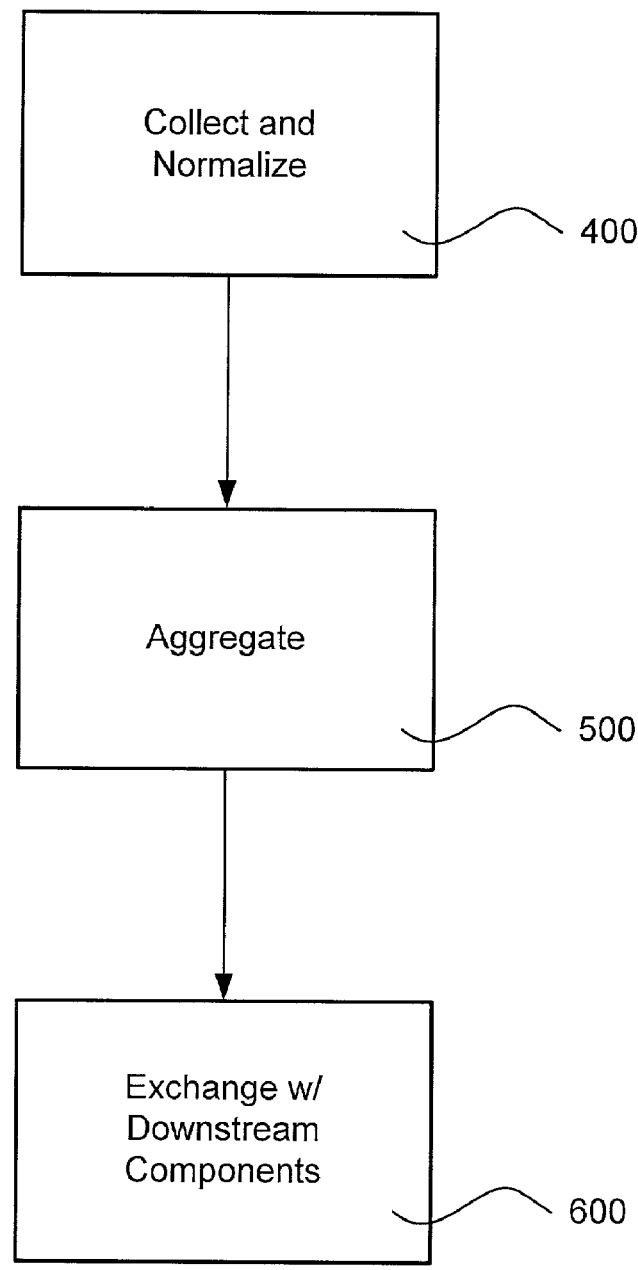
FIG. 2 is a flow diagram depicting a data collection process according to embodiments of the present invention.

As shown by the flow diagram of FIG. 2, data collection process 200 may be implemented according to the three tier structure 100 so as to provide a data collection platform according to embodiments of the present invention. The data collection process 200 according to the present invention first initiates a collection and normalization task 400 that collects statistics and call/usage event data from various elements of a given network, validates the collected data, and converts the data to a normalized format. Process 200 then initiates an aggregation task 500 that receives the normalized usage event data from task 400, associates related event data, optionally augments the data as necessary and/or performs any other user-defined actions (such as rating) and ultimately combines the event data into full, usage detail records for each call or usage session. Process 200 then finally initiates a exchange task 600 that converts the aggregated usage detail records into various pre-defined data output formats as necessary and communicates the output-formatted aggregated usage detail records to network elements and downstream applications through necessary protocols.

As will be readily apparent to one skilled in the art from the description herein, embodiments of the data collection process 200 of the present invention enable data collection for supporting usage sensitive billing. Such processes are suitable for use by network service providers that operate networks of various types, including X.25, frame relay ATM, and VoIP networks. Furthermore, embodiments of the present invention enable simple modular-fashion modification of process 200 or structure 100 to accommodate new network hardware or OSS/BSS elements as the are added as will be more thoroughly understood upon reading the description that follows.

Figure 3:
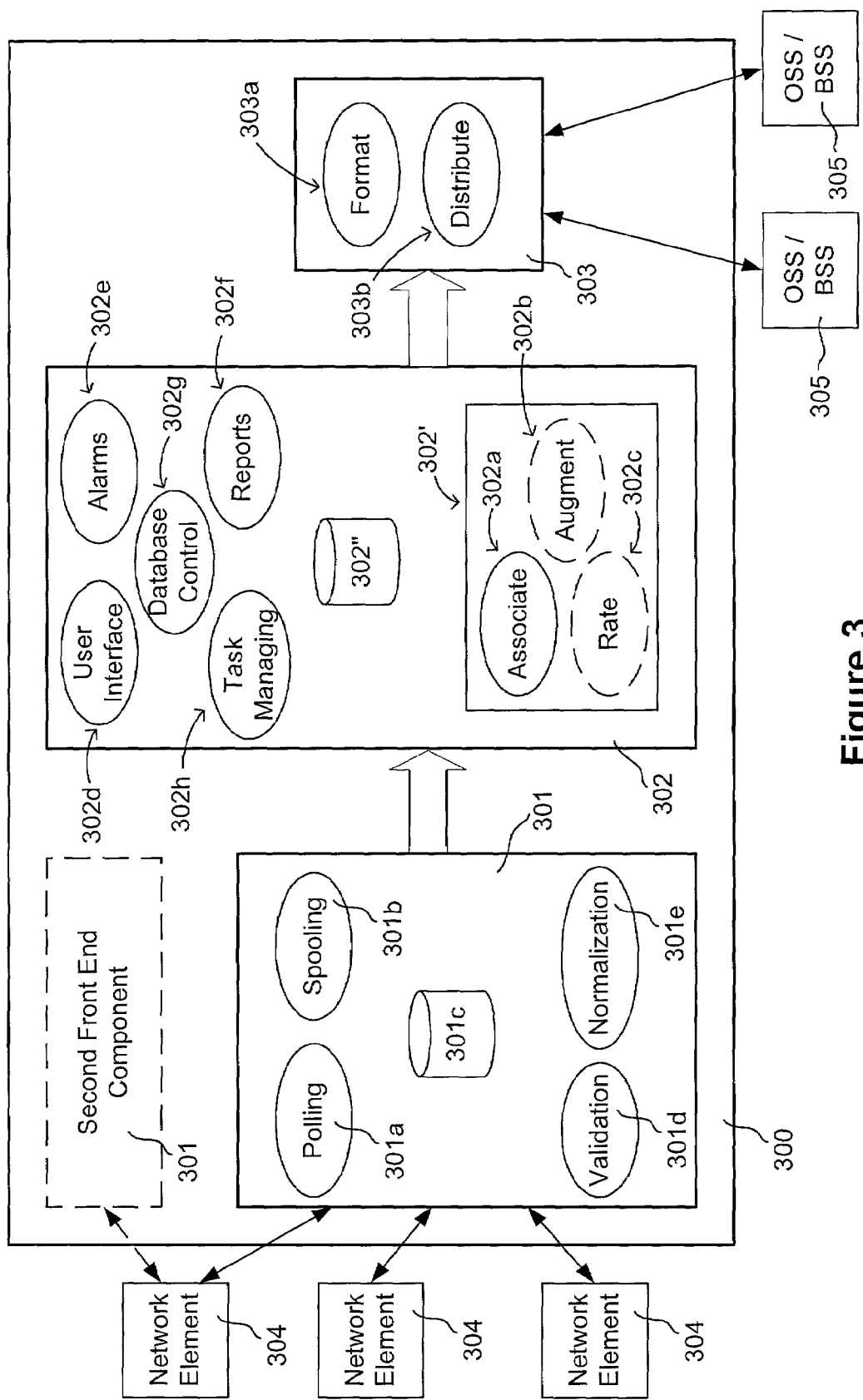
FIG. 3 is a schematic diagram depicting the manner in which a data collection platform according to the present invention operates in conjunction with various network elements and business and/or operation support systems.

Referring now to FIG. 3, there is presented a schematic diagram that depicts the arrangement and interaction of a data collection platform system 300 according to the present invention with various network elements 304 and business and/or operation support systems 305. As depicted in FIG. 3, data collection platform system 300 according to one embodiment of the present invention accomplishes the above-described processes and requirements by employing a multi-tiered architecture comprising a front end component 301, a core mediation component 302, and a back end component 303 all in electronic intercommunication.

Each of the components 301–303 that form the data collection platform system 300 are comprised of suitable servers (computing devices), storage devices (including databases as herein described and other suitable means known in the art), memory devices and support hardware as is known in the art of computer networks to achieve the functions of each component 301–303 as hereinafter described. It will, however, be readily appreciated by one of ordinary skill in the art that the functions of components 301–303 can be alternatively performed by a single computing device or by many computing devices in electronic communication. The three components 301–303 that comprise the depicted data platform system 300 are meant to merely demonstrate how a preferred system according to the present invention would operate in a sample working environment.

Data collection platform systems 300 according to preferred embodiments of the present invention operate in a UNIX environment and electronically connect with various network elements 304 such as one or more hardware devices or databases through high-speed links as depicted in FIG. 3. The platform system 300 depicted in FIG. 3 includes a data collection front end component 301 and a core mediation component 302 having a record processing engine 302'. The front end component 301 supports both polling functionality 301a and spooling functionality 301b for collecting usage event data from network elements and selectively employs functionalities 301a and 301b depending upon how data transmission is normally initiated for a particular network element 304 with which the front end component 301 is communicating. (The front end component is configured by the user to automatically recognize which functionality 301a or 301b to use for a given network element 304.) The front end component 301 captures call or usage event data and typically secures it in storage 301c (such as a database or hard disk). Optionally, of course, the usage event data could be retained only in memory in the alternative. The front end component 301 then validates the data (using validation functionality 301d) and converts it into a normalized format (using normalization functionality 301e) for communication of the record to the record mediation component 302 for later use by the record processing engine 302'. As is described in detail below with respect to FIG. 4, the front end component is pre-configured by the user to associate each network element 304 with the proper manner in which to collect usage event data therefrom as well as the proper normalization function by which to convert the usage event data into a normalized format recognized be the core mediation component. As depicted in the figure, more than one front end component 301 can be employed to collect usage event data simultaneously and independently from a variety of disparate network element 304 sources.

The record processing engine 302' of the core mediation component 302 aggregates the normalized usage event data received from the front end component 301 and stored in database 302" (or alternatively passed directly into memory from front end component 301), and optionally performs any desired user-defined functions (such as augmentation with external data, correlating, reformatting or rating) on the aggregated data. The processing engine 302' is adapted to operate on normalized data collected and provided by the front end component 301 to associate usage event data together into usage or call detail records (using associate functionality 302a). Optionally, record processing engine 302' can be adapted by the user to augment associated call details records with external data (using optional augment functionality 302b) and/or perform other user-defined optional actions such as rating final call or usage detail records (using rate functionality 302c). (The optional aspects being depicted in the figure with broken lines.) Rate functionality 302c, optionally employed in some preferred embodiments of the present invention, allows the data optionally to be rated according to billing rules as they are processed in the core engine 302'. In this manner, of course, an individual downstream OSS/BSS rating component is not necessary. As described above, the engine 302' aggregates related usage event data into complete call detail records (the processes involved being described in detail below with respect to FIG. 5) by eliminating any duplicate event data and compiling usage sensitive counters and data to produce usage detail records and reports. Optionally, the aggregation engine 302' also contains APIs (not illustrated) that enable vendor specific data formats to be aggregated through shared library calls.

As shown in the figure, the core mediation component 302 also contains core administrative functionalities 302d–302h for providing standard administration functions for the data collection platform system including a user interface functionality 302d for supporting a graphical user interface ("GUI") and/or web platform that allows users to provide inputs as necessary to the system as well as view various types of data and information. As is known in the art of computer networking, a user can use a user interface device, such as a workstation or personal computer, to view and input network element and OSS/BSS configuration information, etc., as required by the processes described herein. Since preferred embodiments of the present invention are computer networks, such a user interface is necessary to permit users to interact with the various databases in the system 300 and to define how the front end component 301, back end component 303 and related processes are configured. The user interface functionality 302d preferably supports graphical interaction and access over the distributed networks such as the Internet such that the platform system can provide visibility and access to usage data across an entire collaborative organization. Other suitable administration functionalities incorporated into the core mediation component 302 include alarm generation 302e, report generation 302f, database access and control 302g, and task management 302h.

The back end component 303 according to the present invention is adapted to exchange the aggregated usage/call detail records with necessary elements of the network service provider's network including a downstream OSS/BSS. The back end component receives the aggregated usage detail records in the normalized format and formats the data in the usage detail records into appropriate industry standard output formats (such as BAF, EMI or IPDR) or user-defined proprietary formats (using format functionality 303a) and appropriately distributes the formatted usage detail records through a variety of protocols to downstream OSS/BSS network elements 305 (using distribute functionality 303b). Similar to front end component 301, back end component 303 is pre-configured by the user to recognize the proper output formats needed by downstream systems and be able to convert the usage detail records, what are in a normalized format, into those proper output formats and then use appropriate communication protocols to distribute the usage detail records in proper output format as necessary and desired. This aspect of the invention is discussed again below with respect to FIG. 6.

As will be readily appreciated by one of ordinary skill in the art, by limiting new software development for each new network element 304 and its associated protocol to the front end component 301 and new software development for modifications to an OSS/BSS or other downstream element to the back end component 303, adapted embodiments of the present invention can be more rapidly developed and deployed. Additionally, such adapted embodiments are necessarily more reliable due to the large portion of reused code in the core mediation component 302 of the data collection platform system 300.

The data collection platform system 300 according to the present invention can thereby be adapted to utilize polling or spooling data collection modes, support multiple input and output protocols, operate in primary or secondary collection modes, and handle various proprietary and standardized records formats including Bellcore Automated Message Accounting format ("Bellcore AMA format" or "BAF"), exchange message interface ("EMI") format, and internet protocol detail record ("IPDR") format. Further, the present invention may process point-to-point and point-to-multipoint call records.

Figure 4:
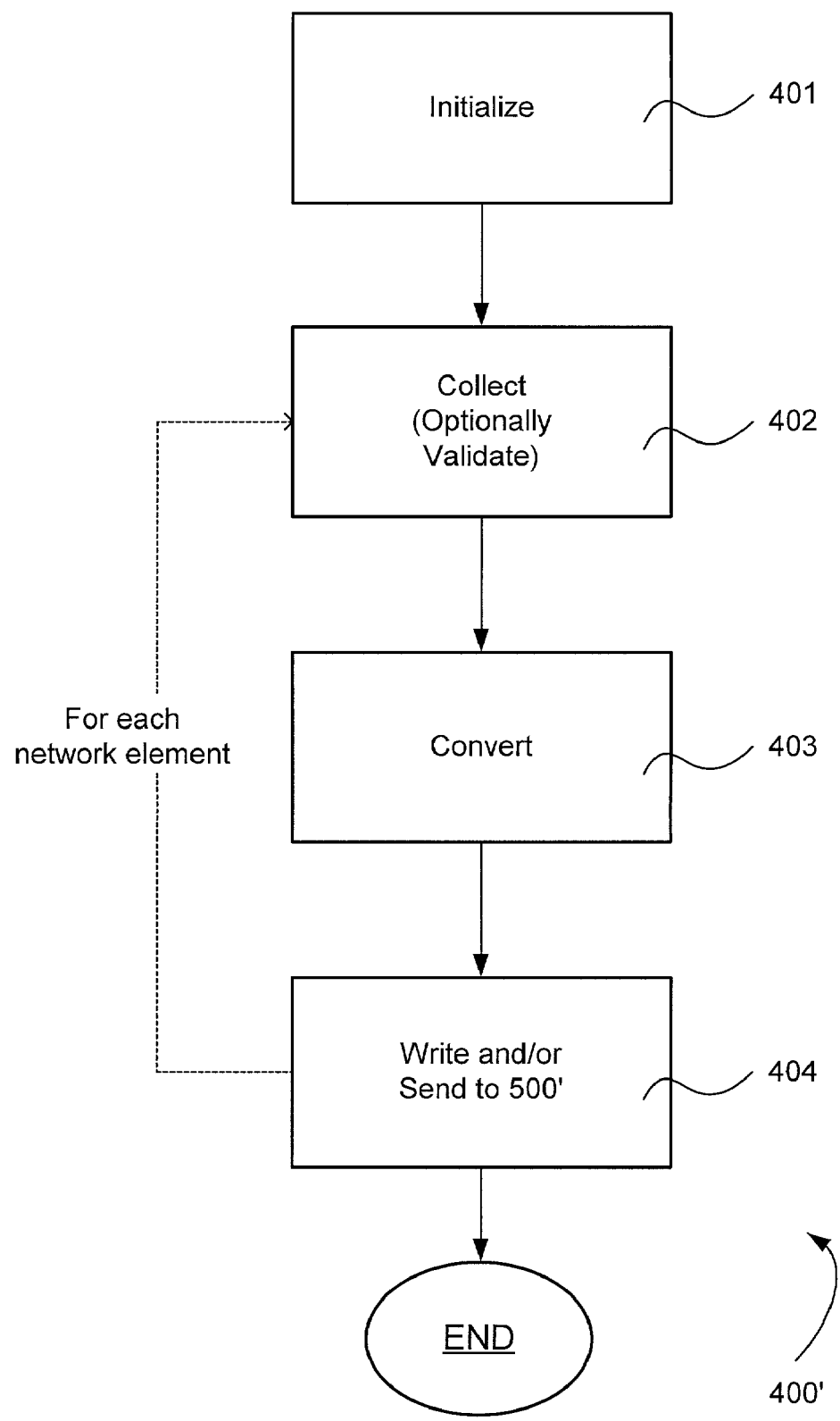
FIG. 4 is a flow diagram depicting a collection and normalization task according to embodiments of the present invention.
Figure 5:
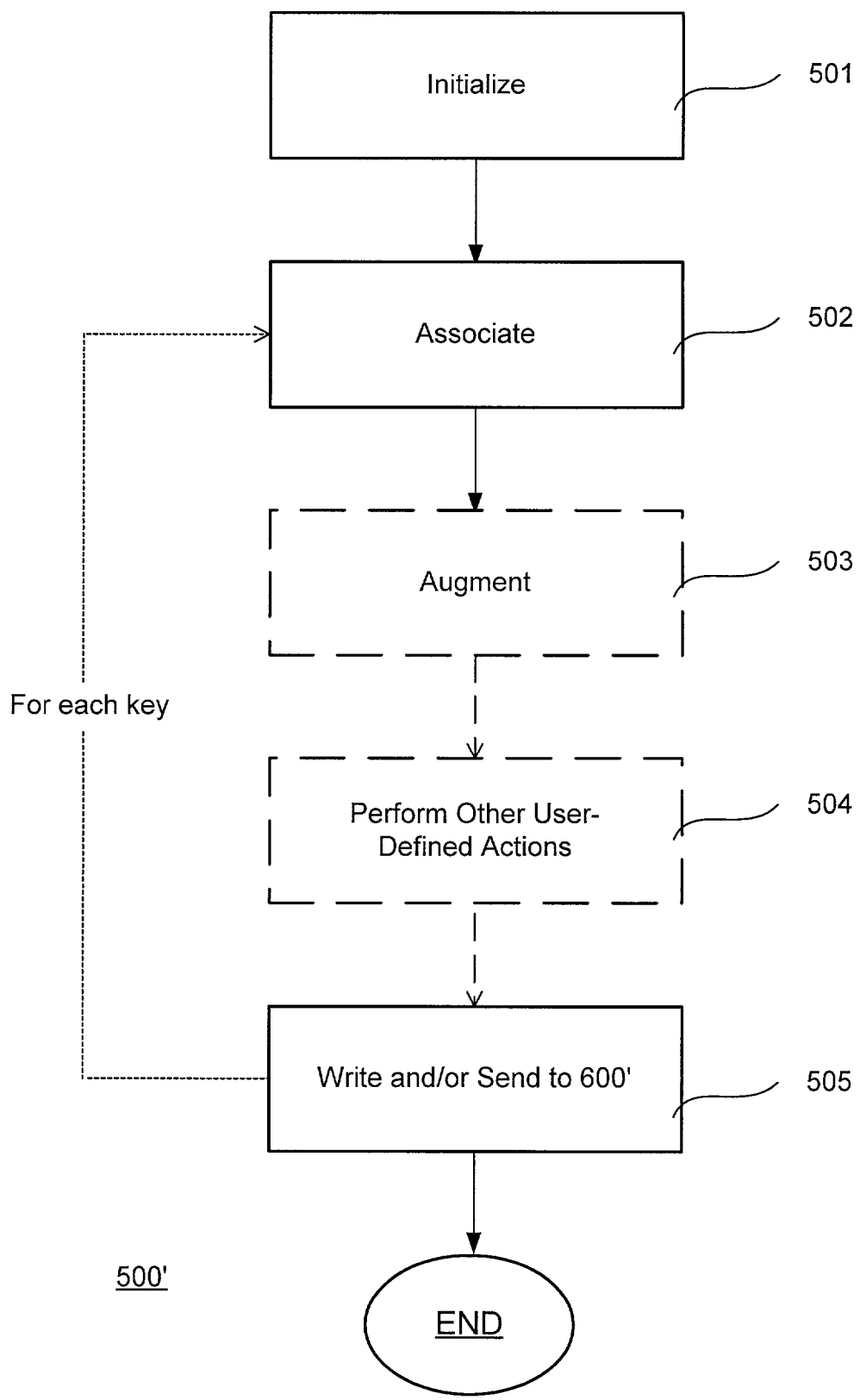
FIG. 5 is a flow diagram depicting an aggregation task according to embodiments of the present invention.
Figure 6:
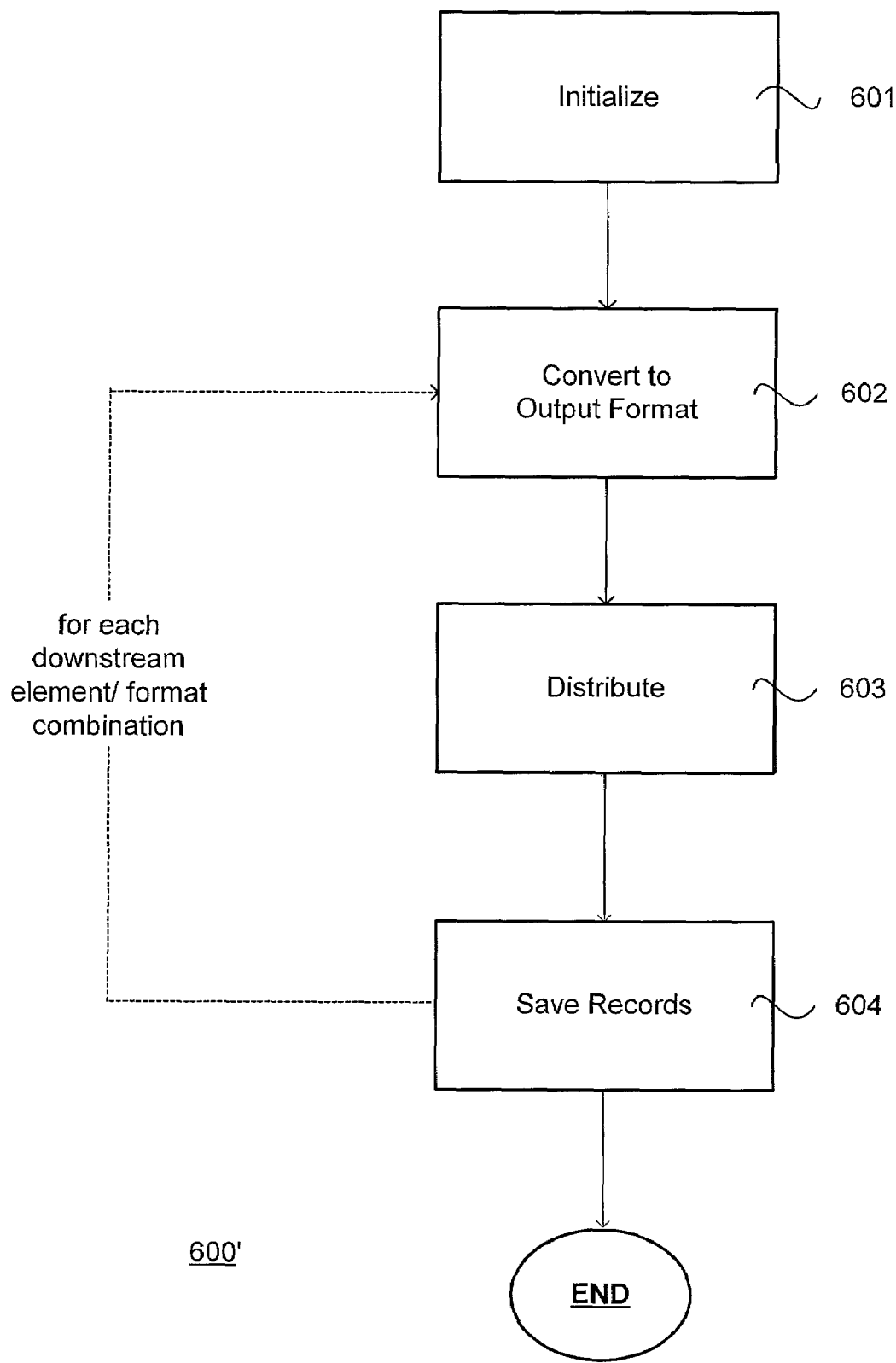
FIG. 6 is a flow diagram depicting a data exchange task according to embodiments of the present invention.

FIGS. 4, 5 and 6 are flow diagrams depicting a collection and normalization task process 400', an aggregation task process 500' and an exchange task process 600' employed by the components of a data collection platform system 300' according to preferred embodiments of the present invention. Referring to FIG. 4, collection and normalization task process 400', which is performed by the front end component 301 in most preferred embodiments of the present invention, first initializes 401 by loading relevant configuration libraries and opening necessary input files. The configuration libraries, for example, can contain information preset by a user of a platform system 300 or process 200 according to the present invention. This preset configuration information identifies various network elements from which usage event data needs to be collected, the manner in which the data should be collected from those network elements, and the appropriate functions that will convert the collected usage event data into a normalized format.

As indicated above, the collection and normalization task process 400' according to preferred embodiments of the present invention supports both polling and spooling functionality at collect step 402 to obtain usage event data from various network elements. At collect step 402, task process 400' selectively employs either spooling collection routines or polling collection routines as are known in the art depending upon how usage event data transmission is normally initiated for a particular network element with which the front end component 301 is communicating (whether spooling or polling should be used is indicated by the configuration information obtained during initialization 401). Also, while performing collection step 402 to obtain the usage event data, task process 400' optionally validates the data by authenticating the usage event data as coming from a particular network element, determining whether the network element is authorized to provide such usage event data, and/or determining whether the data been processed before or transmitted out of sequence with other data. Also optionally, at collection step 402, task process 400' may secure the captured call or usage event data in storage (such as a database or hard disk) for back up purposes.

Collection and normalization task process 400' then converts 403 the collected usage event data into a normalized file format that will be recognized by process 200 for later aggregation (as described above with respect to FIG. 2 and below with respect to aggregation task process 500' depicted by FIG. 5). As with the determination whether to employ spooling or polling functionality to collect usage event data from a given network element, the configuration information read during initialization step 401 indicates the exact usage event data conversion functions that should be employed to convert the usage event data collected in step 402 successfully into normalized usage event data in step 403.

After the collected usage event data is converted into a normalized format, at write/send step 404 task process 400' either writes the normalized usage event data into a normalized events database or alternatively sends the data directly to aggregation task process 500' depicted in FIG. 5. At this point, collection and normalization task process 400' ends.

As will be readily appreciated by one skilled in the art, steps 402–404 as depicted would necessarily need to be performed either in repeated or cyclical fashion to obtain the desired usage event data from multiple network elements (i.e., performing steps 402–404 repeatedly, as shown by the broken connecting line in FIG. 4, until usage event data has been obtained from each network element of interest). Alternatively, of course, multiple instances of collection and normalization task process 400' could be run simultaneously such that usage event data from more than one network element could be obtained in parallel.

Figure 7:
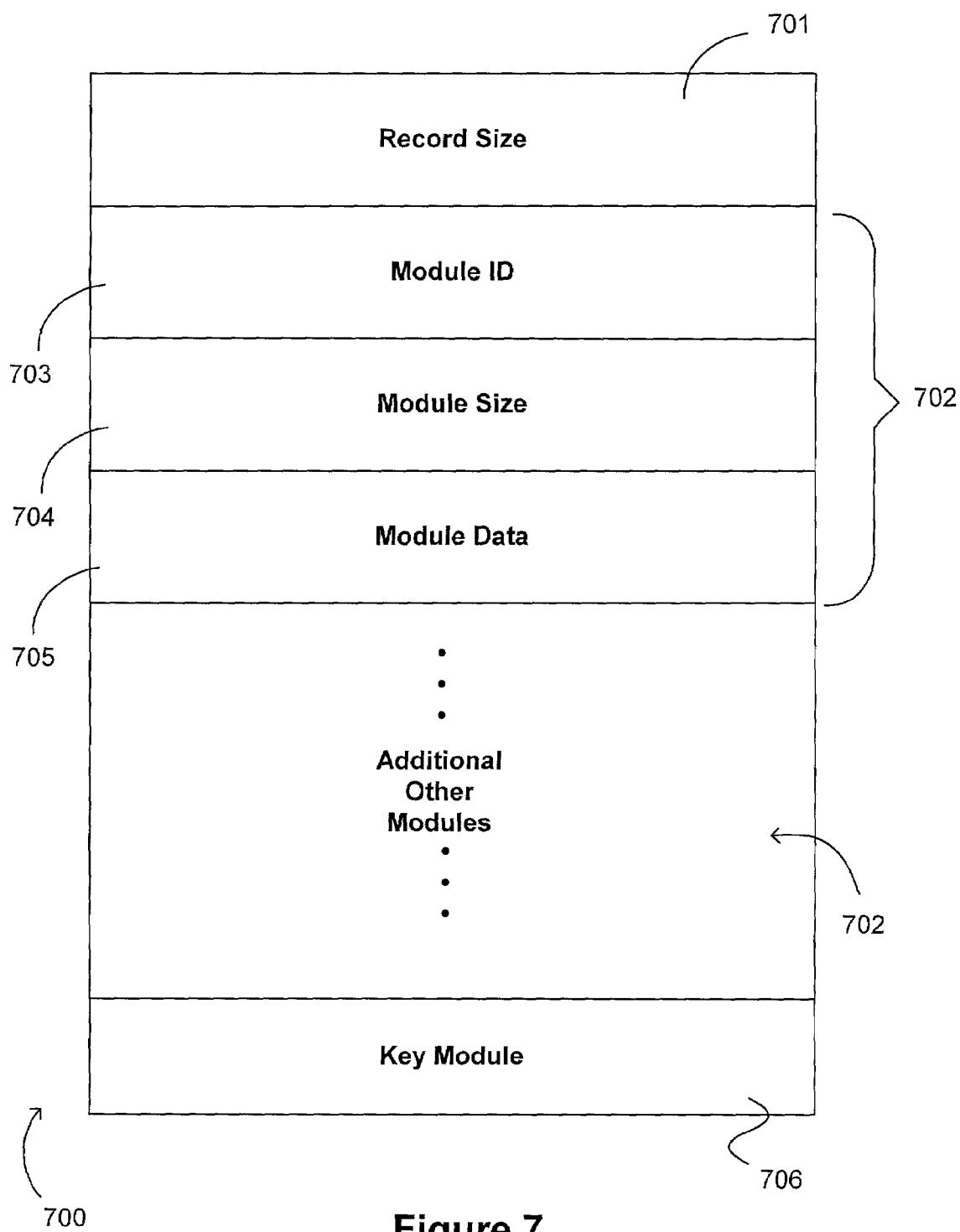
FIG. 7 is a schematic diagram depicting a normalized data format generated by a data collection platform according one embodiment of the present invention.

FIG. 7 is a schematic diagram logically depicting a file 700 in normalized data format generated by a collection and normalization task process 400' that is operating on a data collection platform system 300 according one embodiment of the present invention. A normalized file 700 contains the data from one or more usage event data instances and is produced by the normalization step 403 (preferably by the front end component 301 as described above) and utilized by aggregation task process 500'. (Aggregated usage detail records are also normalized files) In preferred embodiments, normalized record files are composed of a two byte unsigned short integer value, record size integer 701, that indicates the length of the normalized data (that follows thereafter) contained in the file 700. The record size integer 701 value is followed by one (in the case of a file having non-aggregated data) or more (in the case of aggregated files) normalized data modules 702. Each data module 702 is comprised of a two byte unsigned short integer, module ID integer 703, a second two byte unsigned short integer, module size integer 704, and a known number N of bytes of module data 705 representing usage data wherein N is indicated by the value of the module size integer 704 for that particular data module. The N bytes of usage data in each data module 702 contains one or more fields of information.

Further, each normalized file 700 contains exactly one key module 705. The key module 705 uniquely identifies a call or online session (that may be comprised of various "events" sharing the same key module 706 value). In normalization step 403 above, as new data formats are normalized, The key module 705 identifies usage event data which should be aggregated is used according to this embodiment of the present invention to keep usage event data from one call or online session separate from usage event data from unrelated calls or online sessions. As will be readily appreciated by one skilled in the art, instead of using the input from a collection and normalization task process 400', aggregation task process 500' could alternatively be adapted to utilize application program interfaces ("APIs") to enable vendor specific data formats to be aggregated through pre-configured shared library calls. It should also be understood that file 700 depicted in FIG. 7 is just one layout of a normalized file suitable for use in the present invention. For example, key module 705 suitably may be provided at the beginning of file 700 as opposed to the end as depicted.

Referring back to FIG. 5, there is depicted an aggregation task process 500' according to preferred embodiments of the present invention. Performed by the engine 302' of the core mediation component 302, the aggregation task process' as shown in the figure aggregates the normalized usage event data prepared by the collection and normalization task process 400'. Aggregation task process 500' first initializes 501 by loading relevant configuration libraries and opening necessary input files (such as, for example, if collection and normalization task process 400' had written normalized usage event data into a database) and output files. The configuration libraries, for example, can contain information preset by a user of a platform system 300 or process 200 according to the present invention that correlates particular usage event data for augmentation or rating, informs task process 500' regarding which normalized files to process, etc.

Next, aggregation task process 500' associates 502 usage event data from the same call or online session together into usage or call detail records (such as by, for example, locating normalized files having identical key module values and combining them into a single aggregated normalized file containing all the related data modules for the call or online session). Also, if necessary, associate step 502 identifies and eliminates any duplicate event data.

If indicated by the configuration information obtained in initialization step 501, optionally at augment step 503 aggregation task process 500' augments associated call details records with external data (the optional nature of step 503 being shown in FIG. 5 by the use of broken lines). A use may optionally decide to employ augmentation at step 503 in order to add value to the usage data obtained from network elements. Oftentimes, usage data obtained from the network elements do not identify useful information like a person or customer associated with the usage. In such cases, useful information held in some other data repository is applied to associated usage records to enhance the value of that usage detail record to downstream systems. For example, knowing that a particular call from IP address Z began at 10 pm and lasted 63 minutes is useful, but the record can be augmented to include a name and address of a billable party to make the record more useful to downstream OSS/BSS elements. The output of augmentation step 503 is complete call detail records in normalized file format.

Optionally (the optional nature being shown in FIG. 5 by the use of broken lines), aggregation task process 500' could also be configured by the user to perform other user-defined operations 504 on the normalized usage detail records before ending. Such user-defined operations could include, for example, rating of records (if downstream BSS/OSS does not support such) or tracking of average session times to help administer load allocation.

After the usage detail records have had augmentation or any other user-defined operations performed thereon, write/send step 505 aggregation task process 500' either writes the aggregated normalized record files into an aggregated records database or alternatively sends the data directly to exchange task process 600' depicted in FIG. 6. Aggregation task process 600' then ends.

As will be readily appreciated by one skilled in the art, steps 502–505 as depicted would necessarily need to be performed either in repeated or cyclical fashion to aggregate the usage event data for various calls or online sessions (i.e., performing steps 502–505 repeatedly, as shown by the broken connecting line in FIG. 5) until one usage detail records has been compiled for each session represented by key module values.

The flow diagram of FIG. 6 depicts a data exchange task process 600', which is performed by the back end component 303, according to preferred embodiments of the present invention. Exchange task process 600' is adapted to exchange the aggregated usage/call detail records with necessary elements of the network service provider's network including a downstream OSS/BSS. Exchange task process begins by initializing 601 which comprises the loading of relevant configuration libraries and opening of necessary input files. The configuration libraries, for example, can contain information preset by a user of a platform system 300 or process 200 according to the present invention which identifies various downstream network elements (including a BSS/OSS) to which usage event data needs to be distributed, the communication protocol by which the data should be transmitted to those elements, and the appropriate functions that will convert the usage detail record files from normalized format into an output format recognized by the downstream element.

Then, covert step 602 formats any aggregated normalized records into appropriate industry standard output formats (such as BAF, EMI or IPDR) or user-defined proprietary formats as needed by downstream network elements (the formats and the conversion functions being defined by configuration information at initialize step 601). Once the aggregated records have been converted into output format, exchange task process 600' appropriately distributes 603 the output-formatted usage detail records to the downstream network and OSS/BSS elements (protocols and destinations also being pre-configured by the user and loaded during initialization step 601) and then saves 604 usage/call detail records in storage and ends task process 600'.

Preferably, the present invention takes full advantage of the available processing power of the server hosting computerized data collection platforms or processes according to the present invention. At initialization of the collection process, multiple instances of the collection/normalization, aggregation and exchange tasks are spawned to allow for parallel processing of the data collected from the network elements. Additionally, the software may be manually tuned to perform at an even higher capacity with simple updates to configuration files allowing for improved input and output speeds ("I/O") in conjunction with the availability of multiple hard disks and disk controllers.

Preferably, the aggregation task process 500' employed herein utilizes a custom database platform that eliminates the need and the system resource overhead of commercial database products. A database to store aggregated usage detail records and normalized usage event data is necessary to maintain call and session data in the event that platform 300 or process 200 is stopped or interrupted. The preferred aggregation database employed in such embodiments of the present invention uses hashing algorithms and tables to deliver ultra fast search, insert, update and deleting features. The hash tables employed in the database as a whole are implemented with memory management routines that offer exceptionally fast commit times by eliminating the need for possible conversions to take place when exchanging data between storage (i.e., disk) and memory (i.e., RAM). The memory management routines which support the aggregation engine and task processes also beneficially eliminate the potential for memory fragmentation which is a side effect present in many computer systems that operate for extended periods of time allocating and freeing memory.

Figure 8:
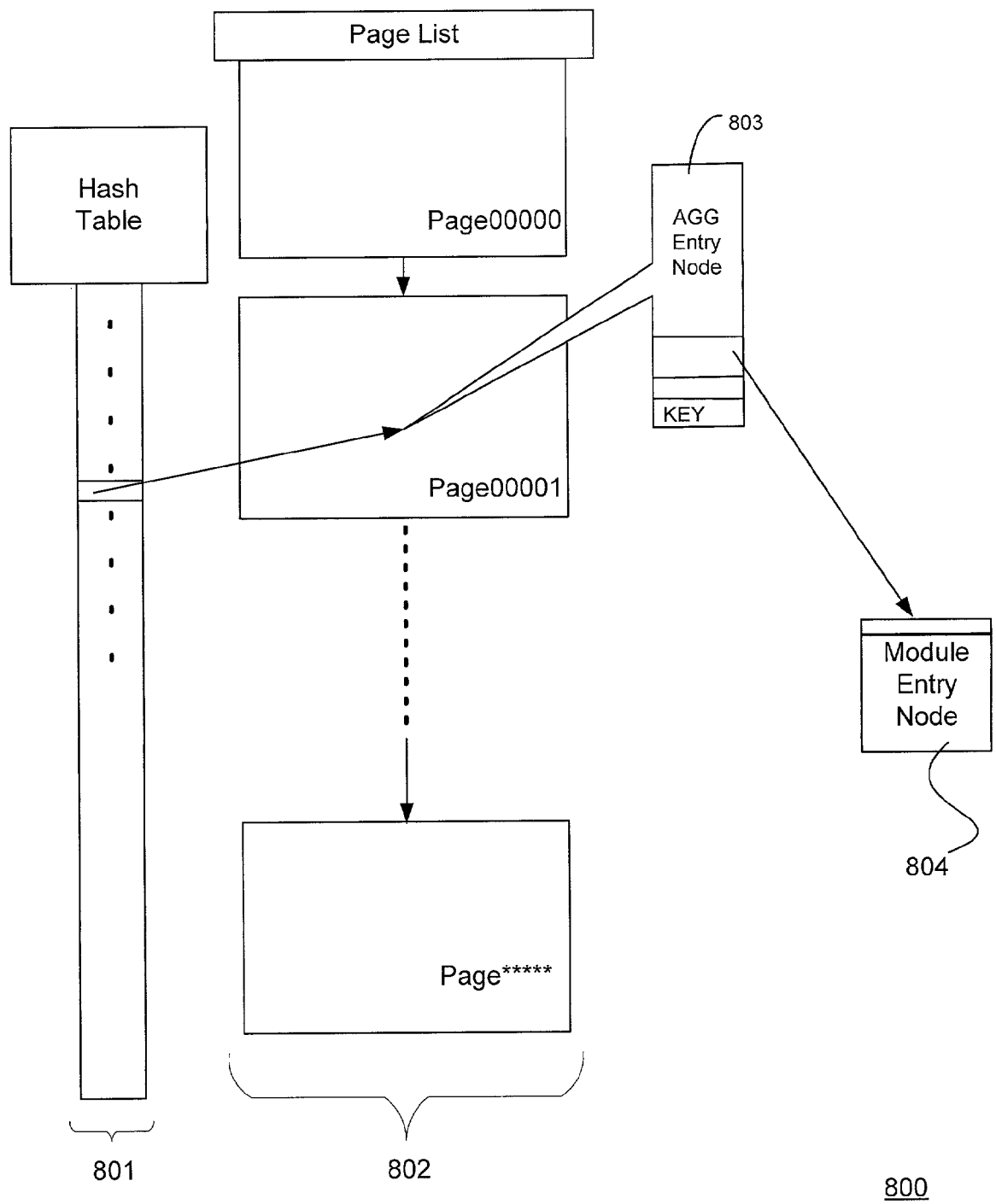
FIG. 8 is a schematic diagram depicting the hashing of normalized records according to preferred embodiments of the present invention.

FIG. 8 is a schematic diagram depicting the hashing of normalized records according to preferred embodiments of the present invention. The database 800, utilized by the aggregation engine according to such preferred embodiments of the present invention, is comprised of two main elements, a hash table 801 and a page list 802. All normalized usage data is organized into "pages" 802' of information in memory. These pages of memory help to sort and organize the usage data when saving or loading. Thus, storage access speeds become the main performance limiting factors when committing or loading the data from or to memory.

The page list 802 depicted in FIG. 8 is a large block of memory used to contain objects of similar sizes. As shown in FIG. 8, all of the usage data and state information for every session or call is kept in the entry node block 803 (containing a module key value) and the module entry node blocks 804 related to each entry node block 803 (through the same module key value) as depicted. Additionally, both the entry node block 803 and the module entry node block 804 are actually contained within the page list 802 space.

In operation, relatively quick access to usage event data is provided by the hash table 801. All normalized files (usage event data and aggregated usage detail records) have a key module value (as described above with respect to FIG. 7) that uniquely identifies the entry of interest in the database. A standard hashing algorithm is applied to the key value to find the related entry node block 803. A list of all entries hashing to the same location is kept within the page space of the database.

Preferably, the hash tables 801 and database 800 as a whole are implemented with memory management routines that offer exceptionally fast commit times and reduce I/O. The memory management routines which support the aggregation engine have also been designed to eliminate the potential for memory fragmentation, which can often occur on systems that have tasks that run, for long periods of time and allocate and free memory. In preferred embodiments of the present invention, the aggregated data is stored in a database using hashing algorithms and memory management routines to provide fast implementation times. During initialization, the aggregation task process 500' aggregation engine 302' would merely need to load both the hash table file and database page file directly into memory to provide increased performance. Likewise, whenever the database needs to be committed to disk (for backup or power down purposes), these large blocks of memory are simply written on a contiguous block of disk space without a pointer conversion taking place.

One of ordinary skill in the art will appreciate that the specific processes for normalization, aggregation and exchange tasks disclosed herein may be modified to take into account specific needs and/or problems encountered in particular industries or situations. Thus, such illustrative algorithms should not be construed to limit the present invention as is claimed.

Although the present invention is preferably implemented in software, this is not a limitation of the present invention as those of ordinary skill in the art can appreciate that the present invention can be implemented in hardware or in various combinations of hardware and software, without departing from the scope of the invention. Modifications and substitutions by those of ordinary skill in the art are considered to be within the scope of the present invention, which is not to be limited except by the claims that follow.

The foregoing description of the preferred embodiments of the present invention has been presented for the purposes of illustration and description. It will be apparent to those of ordinary skill in the art that various modifications and variations can be made to the disclosed embodiments and concepts of the present invention without departing from the spirit or scope of the invention as claimed.

What is claimed is:

1. A computer implemented method for combining usage data from a plurality of network elements to generate usage based and usage sensitive records for network service providers, said method comprising:
    collecting usage event data records from said plurality of said network elements;
    associating with each event data record a key module identifying usage event data as pertaining to a particular usage session,
    converting said usage event data records into a normalized format;
    aggregating said normalized usage event data records by associating said normalized records for related events with one another according to said key modules to form usage detail records, each said usage detail record including said key module and including usage data of a known length for one or more usage event data records pertaining to a same usage session; said aggregating step employing an in-memory database comprising a hashing table and page files retained in local memory, said page files and hashing table being related according to said key modules, said normalized and aggregated usage event data records being located in said page files; and
    exchanging said usage detail records with downstream elements by converting said usage detail records into an appropriate data output format and distributing said output-formatted data to said downstream elements.

2. The method according to claim 1, wherein said collecting said usage event data records comprises identifying an appropriate collection mechanism for each of said network elements and using said identified appropriate collection mechanism to collect said usage event data records from said each network element.

3. The method according to claim 2, wherein said appropriate collection mechanism is selected from a group consisting of polling and spooling.

4. The method according to claim 1, further comprising validating said usage event data records after they are collected and before they are converted into a normalized format.

5. The method according to claim 1, wherein said aggregating of said normalized usage event data records includes augmenting usage data in said normalized usage event data records with external data.

6. The method according to claim 1, wherein said aggregating of said normalized usage event data records includes applying a predefined rating criteria to said usage detail records prior to said exchanging of said usage detail records.

7. The method according to claim 1, wherein said method is computer implemented and said aggregating step is performed by a data processing engine of a core mediation component, said core mediation component also permitting a user to access core administrative functionalities such that said core mediation component may be used with any type of network elements and any type of downstream elements.

8. The method according to claim 7, wherein said core administrative functionalities are selected from a group consisting of alarm generation, user interface, report generation, database control, and task management.

9. The method according to claim 7, wherein said collecting and said converting steps are performed by a front end component configurable to collect said usage event data records from said any type of network elements and convert said usage event data records into said normalized format using appropriate conversion functions.

10. The method according to claim 7, wherein said exchanging of said usage detail records is performed by a back end component configurable to convert said usage detail records into said appropriate data output format and distribute said appropriately output-formatted data to downstream elements as necessary.

11. The method according to claim 10, wherein said exchanging of said usage detail records comprises identifying with each of said downstream elements an output format and a output protocol, and for each said downstream element converting said usage detail records into said identified output format and distributing said output-formatted usage detail records to said each downstream element through said identified output protocol.

12. The method according to claim 1, wherein said exchanging of said usage detail records comprises identifying with each of said downstream elements an output format and an output protocol, and for each said downstream element converting said usage detail records into said identified output format and distributing said output-formatted usage detail records to said each downstream element through said identified output protocol.

13. A multi-tiered computing architecture for transmitting usage data from a plurality of data generating network elements to a plurality of downstream data processing network elements, said architecture comprising:
    a front-end component, said front end component being adapted to collect usage event data records from said plurality of said network elements and convert said usage event data records into a normalized format, said normalized usage event data records having a key module that identifies usage event data as pertaining to a particular usage session, a core mediation component, said core mediation component being adapted to aggregate said normalized usage event data records according to said key modules into usage detail records by associating said normalized records for events related to a same usage session, each said usage detail record including said key module and including usage data of a known length for one or more usage event data records pertaining to a same usage session; said aggregating step employing an in-memory database comprising a hashing table and page files retained in local memory, said page files and hashing table being related according to said key modules, said normalized and aggregated usage event data records being located in said page files; and a back-end component, said back end component being adapted to exchange said usage detail records with said downstream elements by converting said usage detail records into an appropriate data output format and distributing said output-formatted data to said downstream elements.

14. The system according to claim 13, wherein said core mediation component comprises multiple server machines running in parallel to allow for efficient processing of multiple data input streams from one or more front end components.

15. The system according to claim 13, wherein more than one of said front end components operate in parallel with a single core mediation component to speed to said collection and converting of said usage event data records.

16. The system according to claim 13, wherein said components exchange information using a normalized file format.

17. The system according to claim 13, wherein said front end component collects said usage event data by using a pre-defined appropriate collection mechanism for each of said network elements.

18. The system according to claim 17, wherein a given pre-defined appropriate collection mechanism is selected from a group consisting of polling and spooling.

19. The system according to claim 13, wherein said front end component is further adapted to validate said usage event data records after they are collected and before they are converted into a normalized format.

20. The system according to claim 13, wherein core mediation component is further adapted to augment usage data in said normalized usage event data records with external data.

21. The system according to claim 13, wherein said core mediation component is further adapted to apply a pre-defined rating criteria to said usage detail records.

22. The system according to claim 13, wherein said core mediation component permits a user to access core administrative functionalities such that said core mediation component may be used with network elements and downstream elements.

23. The system according to claim 13, wherein said core administrative functionalities are selected from a group consisting of alarm generation, user interface, report generation, database control, and task management.

* * * * *